UNITED STATES PATENT OFFICE.

DAVID T. DAY, OF WASHINGTON, DISTRICT OF COLUMBIA, ASSIGNOR OF TWO-THIRDS TO F. B. SQUIRE, OF CLEVELAND, AND AMOR SMITH, JR., OF CINCINNATI, OHIO.

PROCESS OF MAKING PHOSPHATES SOLUBLE IN DILUTE CITRIC ACID.

SPECIFICATION forming part of Letters Patent No. 542,080, dated July 2, 1895.

Application filed November 26, 1894. Serial No. 530,018. (No specimens.)

*To all whom it may concern:*

Be it known that I, DAVID T. DAY, a citizen of the United States, residing at Washington, in the District of Columbia, have invented certain new and useful Improvements in Processes of Making Phosphate-of-Lime Fertilizers; and I do hereby declare the following to be a full, clear, and exact description of the invention, such as will enable others skilled in the art to which it appertains to make and use the same.

This invention relates to the manufacture of a phosphate of lime suitable for use as a fertilizer without the use of an acid.

The object of my invention is to economically produce, at a comparatively low temperature, from phosphate rock a maximum amount of phosphates of lime, soluble in dilute citric acid solution, for use as a fertilizer.

I have discovered that by heating any form of phosphate rock containing carbonate of lime the normal phosphate of lime, which is insoluble in a dilute solution of citric acid, (one part of citric acid dissolved in twenty parts, by weight, of water,) is converted into a form to a large extent soluble in such dilute citric acid, and that a maximum percentage of such phosphate will result, provided the temperature is not carried to a degree at which the mass undergoes partial fusion. If the process is conducted at the proper low temperature, the largest obtainable amounts of such citric acid soluble or available phosphate of lime is formed by the action of the oxid of lime formed by the decomposition of such carbonate as occurs with the phosphate in the native phosphate of lime. In carrying out the process the temperature is preferably kept below a strong white heat, but above 1,350° Fahrenheit, the point at which carbonate of lime loses its carbon oxid, and as a result the reactions take place quantitatively. I have also discovered that by having a suitable percentage of silica present in the mixture or in the phosphate rock, the operation of converting the phosphate of lime into a form soluble in dilute citric acid is much facilitated, the time required to produce the result is lessened, and the expense reduced.

The temperature of partial fusion I have found to be quite injurious to the resulting product. If the product is heated for a considerable time at a temperature of partial fusion, the percentage of citric acid soluble phosphate falls much below the maximum, with the result that the product is injured for use as a fertilizer.

The phosphate should contain, naturally, or by suitable admixture, a minimum proportion of one equivalent of calcereous base—*i. e.*, carbonate of oxid or hydrate—to each equivalent of any phosphate. A smaller proportion of calcareous base may be used, but it will reduce the amount of available phosphoric acid.

I preferably select phosphates which contain naturally enough silicious material to furnish a maximum of fifteen per cent. of silica in the finished product; or, in case the phosphate rock contains little or no silicious material, a sufficient amount of silica, such as sand, ground quartz, infusorial earth, glass, clay, &c., is added to such rock to produce the required result, and, preferably, to furnish no more than a maximum of fifteen per cent. of silica in the finished product, but larger or smaller quantities may be used. Phosphate rock poor in silica may be mixed with a phosphate rock rich in silica in such proportion as to obtain a mixture containing the preferred percentage of silica. The mixture of phosphate of lime, carbonate of lime, and silica, should be made as uniform as convenient or practicable before it is subjected to the heating operation. This mixture is then placed in a reverberatory or cupola furnace or other heating device and heated to the desired temperature until the results as described herein are secured. The time of heating the material varies within wide limits, depending on the nature of the phosphate used, and particularly on the natural or artificial mixing of the phosphate, calcareous base, and silicious material. Thus, if any forms of the above substances are mixed together and heated to a temperature above 1,350° Fahrenheit for a comparatively short time, the production of soluble phosphate begin. If the materials are hard-rock phosphates or apatite and the mixing has not been thoroughly done and especially if silica is omitted, a long heating, frequently more than forty hours, is required for obtaining a satisfactory result, unless the temperature is quickly raised to a point a little below that of fusion. With a more intimate artificial mixture, and especially with natural mixtures of phosphates with silicious material and an excess of carbonate of lime, the formation of soluble phosphate goes on more rapidly, and a satisfactory result is obtained in much less time. In the presence of silica the regulation of the temperature is not so necessary. I always take care to maintain the temperature low as practicable in order to develop the production of the largest amount of available phosphate of lime, and at the same time avoid the conversion of any of such phosphate into compounds insoluble in citric acid. Of course the low temperature is the most economical in point of fuel supply, and in addition gives the most satisfactory results in the production of phosphates which are soluble in dilute citric-acid solution. This temperature can also be further reduced to between 1,000° and 1,200° Fahrenheit by the addition to the mixture of a salt of an alkali, such as kainite or a sulfate or muriate of potassium.

Having described my invention, what I claim, and desire to secure by Letters Patent, is—

1. The process of manufacturing a phosphate of lime essentially soluble in dilute citric acid, which consists in heating a natural or artificial mixture of phosphate and a calcareous base in a suitable furnace to the temperature at which carbonate of lime gives up its carbonic acid, and keeping the temperature below the temperature of partial fusion and securing a maximum of citric-acid-soluble phosphates as described.

2. The process of manufacturing a phosphate of lime soluble in dilute citric acid, which consists in heating a natural or artificial mixture of phosphate and an alkaline earthy base and a potassium salt, such as sulphate or muriate, in a suitable furnace, to a temperature below that at which carbonate of lime ordinarily gives up its carbonic acid and maintaining such low temperature, much below the temperature of partial fusion, as described.

3. The process of manufacturing phosphate of lime soluble in dilute citric acid, which consists in heating a mixture composed of phosphate rock containing a suitable percentage of silica, and a calcareous base in a suitable furnace to the temperature at which carbonate of lime gives up its carbonic acid and keeping the temperature well below partial fusion and securing a maximum of citric-acid-soluble phosphate, as described.

4. The process of manufacturing phosphate of lime soluble in dilute citric acid, which consists in heating a natural or artificial mixture of phosphate, a calcareous base, and added silica, to a temperature above that at which carbonate of lime would give off its carbonic acid and maintaining such temperature as described.

In testimony whereof I affix my signature in presence of two witnesses.

DAVID T. DAY.

Witnesses:
H. E. PARKER,
E. B. CLARK.